United States Patent
Holcombe

(10) Patent No.: US 6,240,283 B1
(45) Date of Patent: May 29, 2001

(54) APPARATUS AND METHOD FOR FEEDBACK MITIGATION IN A LOW SPEED COMMUNICATIONS RECEIVER

(75) Inventor: Wayne T. Holcombe, Palo Alto, CA (US)

(73) Assignee: Integration Associates, Inc., Mountain View, CA (US)

(*) Notice: Subject to any disclaimer, the term of this patent is extended or adjusted under 35 U.S.C. 154(b) by 0 days.

(21) Appl. No.: 08/908,661

(22) Filed: Aug. 7, 1997

(51) Int. Cl.$^7$ .............................. H04B 1/06; H04B 10/06
(52) U.S. Cl. .................................. 455/245.1; 455/242.1; 455/240.1; 359/194; 329/350; 375/345
(58) Field of Search .......................... 455/242.2, 242.1, 455/245.1, 241.1, 240.1, 232.1, 234.1, 239.1; 359/194, 152, 153, 161; 375/345, 317, 318, 340, 346; 329/311, 350

(56) References Cited

U.S. PATENT DOCUMENTS

| | | | |
|---|---|---|---|
| 3,619,660 | 11/1971 | Rugo | 327/332 |
| 4,241,455 | 12/1980 | Eibner | 359/194 |
| 4,528,519 | 7/1985 | van Driest | 330/279 |
| 4,757,502 | 7/1988 | Meuriche et al. | 370/318 |
| 5,081,653 | 1/1992 | Saito | 375/345 |
| 5,329,115 | 7/1994 | Lim | 250/214 R |
| 5,361,395 | 11/1994 | Yamamoto | 455/436 |
| 5,557,634 | 9/1996 | Balasubramanian | 375/222 |
| 5,585,952 | 12/1996 | Imai et al. | 359/135 |
| 5,612,810 | 3/1997 | Inami et al. | 359/189 |
| 5,706,110 | 1/1998 | Nykanen | 359/110 |
| 5,760,942 | 6/1998 | Bryant | 359/193 |
| 5,864,591 * | 1/1999 | Holcombe | 375/345 |
| 5,884,153 * | 3/1999 | Okada | 455/242.1 |
| 5,917,865 * | 6/1999 | Kopmeiners et al. | 375/345 |
| 6,018,650 * | 1/2000 | Petsko et al. | 455/245.1 |
| 6,038,049 | 3/2000 | Shimizu et al. | 359/189 |

OTHER PUBLICATIONS

Ernesto Perea "Technology Directions; Optical Interconnects, High Temperature, & Packaging" Feb. 10, 1996, ISSCC96, 8 pages.

(List continued on next page.)

*Primary Examiner*—Edward F. Urban
*Assistant Examiner*—Rafael Perez-Gutierrez
(74) *Attorney, Agent, or Firm*—Vernon W. Francissen; McDonnell Boehnen Hulbert & Berghoff

(57) ABSTRACT

A method and apparatus is shown for controlling the input gain of a receiver wherein the input gain is controlled by sampling an amplified data signal during a time interval when a positive-going feedback transient from an output terminal of the receiver to an input terminal of the receiver is not present in the amplified data signal. An embodiment of a receiver circuit according to the present invention includes an input amplifier having variable gain determined by a gain control signal, a comparator which compares the amplified data signal from the input amplifier to a detection threshold voltage to produce a demodulated data signal and an analog delay circuit which delays the amplified data signal by a predetermined time interval to produce a delayed data signal. A switch is driven by the demodulated data signal to sample the delayed data signal for input to an automatic gain control circuit. The automatic gain control circuit compares the sampled delayed data signal to an automatic gain control threshold potential and rectifies and integrates the resulting waveform to produce the gain control signal. An embodiment of the method of the present invention amplifies a data signal by a gain factor compares the amplified data signal to a detection threshold voltage to produce a demodulated data signal, and delays the amplified data signal to produce a delayed data signal. The method then samples the delayed data signal using the demodulated data signal to produce a sampled data signal that is used to adjust the gain factor.

14 Claims, 3 Drawing Sheets

OTHER PUBLICATIONS

IBM Microelectronics "Infrared Transceiver Module—IBM31T1101" Nov. 6, 1996, http:///www.chips.ibm.com.

Temic Semiconductors "TFDS 6000 Integrated Infrared Transceiver Module IrDA" Aug. 1996, 12 pages.

Hewlett–Packard "Infrared Transceiver Preliminary Technical Data HSDL–1100" Nov. 17, 1995.

Novalog, Inc. "SIRFIR™ 4Mbps IrDA Transceiver" Apr. 1996 info@novalog.com.

Dr. Keming W. Yeh and Dr. Lichen Wang "An Introduction to the IrDA Standard and System Implementation" Wireless System Design May 1996, 11 pages.

Temic Semiconductors"IrDA Compatible Data Tansmission" Apr. 1996, pp. 1–18.

* cited by examiner

APPARATUS AND METHOD FOR FEEDBACK MITIGATION IN A LOW SPEED COMMUNICATIONS RECEIVER

CROSS-REFERENCE TO RELATED APPLICATIONS

This patent application is related to a commonly-assigned patent application entitled "APPARATUS AND METHOD FOR SUPPRESSION OF FEEDBACK IN A COMMUNICATIONS RECEIVER", Ser. No. 08/827,402, filed Mar. 27, 1997, now U.S. Pat. No. 5,864,591, the disclosure of which is incorporated herein by reference.

BACKGROUND OF THE INVENTION

The present invention relates to a circuit and method for sampling an output signal to perform automatic gain control (AGC) in a lowspeed data receiver.

Infrared wireless data communication is a useful method for short range (in the approximate range of 0–10 meters) wireless transfer of data between electronic equipment; such as, cellular phones, computers, computer peripherals (printers, modems, keyboards, cursor control devices, etc.), electronic keys, electronic ID devices, and network equipment. Infrared wireless communication devices typically have the advantages of smaller size, lower cost, fewer regulatory requirements, and a well defined transmission coverage area as compared to radio frequency wireless technology (i.e. the zone of transmission is bounded by physical walls and therefore more useful in an office environment). In addition, infrared wireless communication has further advantages with regard to reliability, electromagnetic compatibility, multiplexing capability, easier mechanical design, and convenience to the user as compared to cable based communication technology. As a result, infrared data communication devices are useful for replacing 0–10 meter long data transfer cables between electronic devices, provided that their size and costs can be reduced to that of comparable cable technology.

Infrared data communications devices typically consist of transmitter and receiver components. The infrared data transmitter section consists of one or more infrared light emitting diodes (LEDs), an infrared lens, and an LED current driver. A conventional infrared data receiver typically consists of an infrared photodiode and a high gain receiver amplifier with various signal processing functions, such as automatic gain control (AGC), background current cancelling, filtering, and demodulation. For one-directional data transfer, only a transmitter at the originating end and a receiver at the answering end is required. For bi-directional communication, a receiver and transmitter at each end is required. A combined transmitter and receiver is called a transceiver.

In typical high volume applications, it is now standard practice to fabricate the receiver circuitry and transmitter driver in a single integrated circuit (IC) to produce a transceiver IC. In turn, a transceiver IC, infrared photodiode and LED along with lenses for the photodiode and LED are assembled together in a plastic molded package designed to be small in size and allow placement in the incorporating electronic device so as to have a wide angle of view (typically through an infrared window on its case). The transceiver IC is designed to digitally interface to some type of serial data communications device such as an Infrared Communication Controller (ICC), UART, USART, or a microprocessor performing the same function.

A representative example of a conventional infrared data transmitter and receiver pair is shown in FIG. 1. Infrared transmitter 10 includes LED 16 which generates a modulated infrared pulse in response to transistor 14 being driven by the data signal input at $D_{IN}$. The modulated infrared signal is optically coupled to an infrared detector, such as photodiode 24 normally operated in current mode (versus voltage mode) producing an output current which is a linear analog of the optical infrared signal falling on it. The infrared pulses generated by LED 16 strike photodiode 24 causing it to conduct current responsive to the data signal input at $D_{IN}$ thereby generating a data signal received at $D_{IR}$.

In receiver 20, the signal received at $D_{IR}$ is transformed into a voltage signal $V_{IR}$ and amplified by amplifier 26. The signal output from amplifier 26 then feeds into comparator 42 which demodulates the received signal by comparing it to a detection threshold voltage $V_{DET}$ in order to produce a digital output data signal at $D_{OUT}$.

The received signal waveform will have edges with slope and will often include a superimposed noise signal. As a result, $V_{DET}$ is ideally placed at the center of the received signal waveform so that the output data signal has a consistent waveform width despite the slope of the received signal edges. Also, placing $V_{DET}$ at the center of the received signal improves the noise immunity of receiver 20 because the voltage difference between $V_{DET}$ and both the high and low levels of the received signal is maximized such that noise peaks are less likely to result in spurious transitions in $V_{OUT}$.

The received signal, however, can vary in amplitude by several orders of magnitude due primarily to variations in the distance between transmitter 10 and receiver 20. The strength of the received signal decreases proportional to the square of the distance. Depending on the range and intensity of the infrared transmitter, the photodiode outputs signal current in the range of 5na to 5ma plus DC and AC currents arising from ambient infrared sources such as sunlight and both incandescent and fluorescent lighting. As a consequence, the center of the received signal waveform will vary, whereas $V_{DET}$ must generally be maintained at a constant level. To address this problem, receivers typically include an automatic gain control (AGC) mechanism to adjust the gain responsive to the received signal amplitude. The received signal is fed to AGC peak detector 36 which amplifies the signal and drives current through diode 32 into capacitor 28 when the signal exceeds the AGC threshold voltage $V_{AGC}$ in order to generate a gain control signal. The gain control signal increases in response to increasing signal strength and correspondingly reduces the gain of amplifier 26 so that the amplitude of the received signal at the output of amplifier 26 remains relatively constant despite variations in received signal strength.

At a minimum, infrared receiver 20 amplifies the photodetector signal current and then level detects or demodulates the signal when it rises above the detect threshold $V_{DET}$ thereby producing a digital output pulse at $D_{OUT}$. For improved performance, the receiver may also perform the added functions of blocking or correcting DC and low frequency AC ambient (1–300 ua) signals and Automatic Gain Control (AGC) which improves both noise immunity and minimizes output pulse width variation with signal strength.

Data can be modulated on the infrared transmitted signal by a number of well known methods. One popular method is defined by the Infrared Data Association (IrDA). IrDA Physical Layer Link Specification 1.1e specifies two main physical layer infrared modulation methods. One method is a low-speed (2 Kbp/s to 1.15 Mbp/s) on-off infrared carrier asynchronous modulation where the presence of a pulse indicates a 0 bit and the absence of a pulse indicates a 1 bit. The second method is a high speed (4 Mb/s) synchronous Four Pulse Position Modulation (4 PPM) method in which the time position of a 125 ns infrared pulse in a 500 ns frame encodes two bits of information.

Because there is ramping on the received waveform $V_{IR}$, which can cause widening or narrowing of the signal pulse unless the detect threshold $V_{DET}$ is in the center of the waveform, AGC improves the fidelity of the output pulse by maintaining $V_{DET}$ at the center of the waveform. The high speed 4 PPM protocol is highly sensitive to pulse width distortion which requires additional complex circuitry to correct. However, the low speed IrDA protocol can function with relatively poor pulse width fidelity and can tolerate pulse width variations of more than three to one without impairment of the demodulation function in the receiver. Thus, the low speed IrDA protocol can be implemented with simpler circuitry.

Low speed transceivers (2.4 Kbits/sec to 115 Kbits/sec) represent a potentially high volume market having high cost sensitivity. Thus, it is particularly desirable to produce receivers at the lowest cost possible. Increased cost is generally associated with increased circuit complexity because complex circuits typically use more components which require more integrated circuit area, have lower yields in fabrication due to lower probability that all components will be functioning correctly, and are usually more time consuming to test. Because low speed protocols can tolerate lower pulse fidelity, low speed transceivers can be designed with relatively simple circuit designs that still yield adequate performance.

One effective circuit design method for designing a relatively simple receiver is described in the commonly-assigned patent application referenced above entitled "APPARATUS AND METHOD FOR SUPPRESSION OF FEEDBACK IN A COMMUNICATIONS RECEIVER", wherein the receiver is designed such that the feedback signal from the output terminal of the receiver to the input terminal is in-phase with the signal received at the input terminal. In this manner, it is possible for receivers which demodulate on-off modulation, as specified by IrDA, to receive signals significantly below the feedback transient amplitude provided that the receiver transient response has little overshoot and either no AGC or high signal threshold AGC is used. Under these circumstances the feedback acts as dynamic hysteresis, producing a pulse without spurious transitions.

One possible limitation of the in-phase feedback method is that in order to prevent AGC desensitization, the AGC threshold needs to be set well above the peak feedback value by a safe tolerance. Although setting the AGC threshold at a high level results in significant variation in detected pulse width, this variation may be acceptable in lowspeed IrDA compatible applications since bit information is encoded by the presence or absence of a pulse and not by its width, so long as the pulse does not widen so much as to interfere with the adjacent pulse window.

Another undesirable limitation of the in-phase feedback method is feedback transient overshoot or ringing, which, if it exceeds the detect level, will cause undesirable extraneous output pulse transitions. Although the use of well known filter design techniques can theoretically limit transient overshoot to any arbitrarily small value, in practice, reducing it to a value below ⅕ or ⅒ the peak level is difficult due to variable phase shift effects internal and external to the infrared receiver. Some of these variable phase shift effects are due to normal variances in such factors as transmit pulse shape, photodiode time constant, photodiode capacitance, receiver supply voltage, filter component values, etc.

Despite these limitations, the in-phase feedback method can beneficially decrease the disruptive effects of feedback by 10 db–20 db for infrared receivers used with edge-triggered serial data communication controllers which do not need an accurate data pulse width or with receiver systems which do not require the benefits of a low threshold AGC.

In-phase feedback control still requires some shielding between the input and output terminals of the receiver since, without shielding, the feedback signal will still be on the order of 10 db–20 db above the minimum received signal. Therefore, some shielding will still be required if feedback mitigation is not accomplished by the receive circuit. However, shields represent a major cost factor. To operate without a shield, the receiver must tolerate feedback levels which are as high as 30 db–40 db above the minimum received signal.

Therefore, the need remains for a relatively simple receiver design which mitigates feedback and tolerates a feedback signal that is 30 db–40 db above the minimum received signal so that the receiver can be constructed with a small size and without a shield.

SUMMARY OF THE INVENTION

The present invention relates to a circuit and design method for a simple receiver circuit wherein the feedback from the output terminal of the receiver to the input receiver is controlled such that the receiver can tolerate feedback on the order of 30db–40db above the minimum received signal level. The present invention controls the effects of feedback by utilizing an analog signal delay network to delay the amplified output signal of the receiver and using a disable signal generated by a detect comparator to sample the output signal during a period when the positive phase of the feedback signal is not present in the output waveform in order to obtain a sample signal for input to an AGC circuit of the receiver.

One embodiment of the present invention is a receiver circuit having a circuit input terminal for receiving an input signal and a circuit output terminal. An input amplifier, having a first input terminal coupled to the circuit input terminal and a second input terminal coupled to a supply voltage terminal, amplifies a signal received at the input terminal of the input amplifier by a gain and outputs an amplified signal, where the gain is controlled by a gain control signal received at a gain control terminal. A comparator receives a detect threshold voltage at a first input terminal, has a second input terminal that is coupled to the output terminal of the input amplifier and has an output terminal of the comparator that is coupled to the circuit output terminal. A analog delay circuit has an input terminal, that is coupled to the second input terminal of the comparator, and an output terminal. A switch has an input terminal coupled to the output terminal of the analog delay circuit, a switching control terminal that is coupled to the output terminal of the comparator, and an output terminal wherein the switch closes a path between the input and output terminals of the switch responsive to a first logic level of a switch control signal received at the switching control terminal. An automatic gain control circuit has an input terminal that is coupled to the output terminal of the switch and an output terminal that is coupled to the gain control terminal of the input amplifier.

An embodiment of a method for controlling gain in a receiver according to the present invention includes receiving a data signal, amplifying the data signal by a gain factor to produce an amplified data signal, comparing the amplified data signal to a detect threshold voltage to produce a demodulated data signal, delaying the amplified data signal by a predetermined time interval to produce a delayed data signal, sampling the delayed data signal responsive to the demodulated data signal to produce a sampled signal, comparing the sampled signal to an automatic gain control threshold voltage to produce an automatic gain control peak detection signal, rectifying and integrating the automatic gain control peak detection signal to produce a gain control signal, and adjusting the gain factor responsive to the gain control signal.

An embodiment of a data receiving circuit according to the present invention includes an input amplifier which receives a data signal and amplifies the data signal by a gain factor in order to produce an amplified data signal, wherein the gain factor is controlled by a gain control signal, a comparator which receives the amplified data signal and a detect threshold voltage and compares the amplified data signal to the detect threshold voltage in order to generate a demodulated data signal. A delay network receives the amplified data signal and delays the amplified data signal by a predetermined delay interval in order to produce a delayed data signal. A switch receives the delayed data signal and samples the delayed data signal responsive to the demodulated data signal in order to produce a sampled data signal. And an automatic gain control circuit receives the sampled data signal and an automatic gain control threshold voltage, compares the sampled data signal to the automatic gain control threshold voltage in order to produce an automatic gain control peak detection signal, and rectifies and integrates the automatic gain control peak detection signal in order to produce the gain control signal.

DETAILED DESCRIPTION OF THE PRESENT INVENTION

Figure 1:
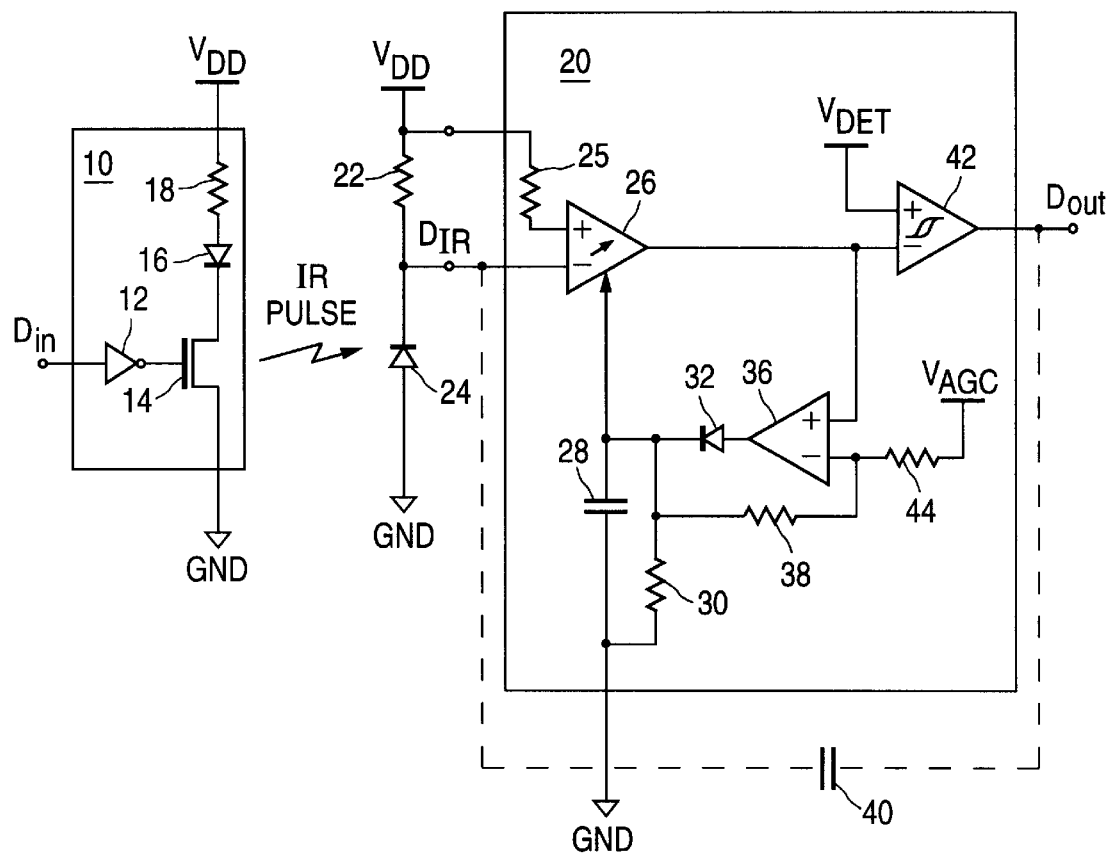
FIG. 1 is a circuit diagram of a conventional infrared transmitter receiver pair.
Figure 2:
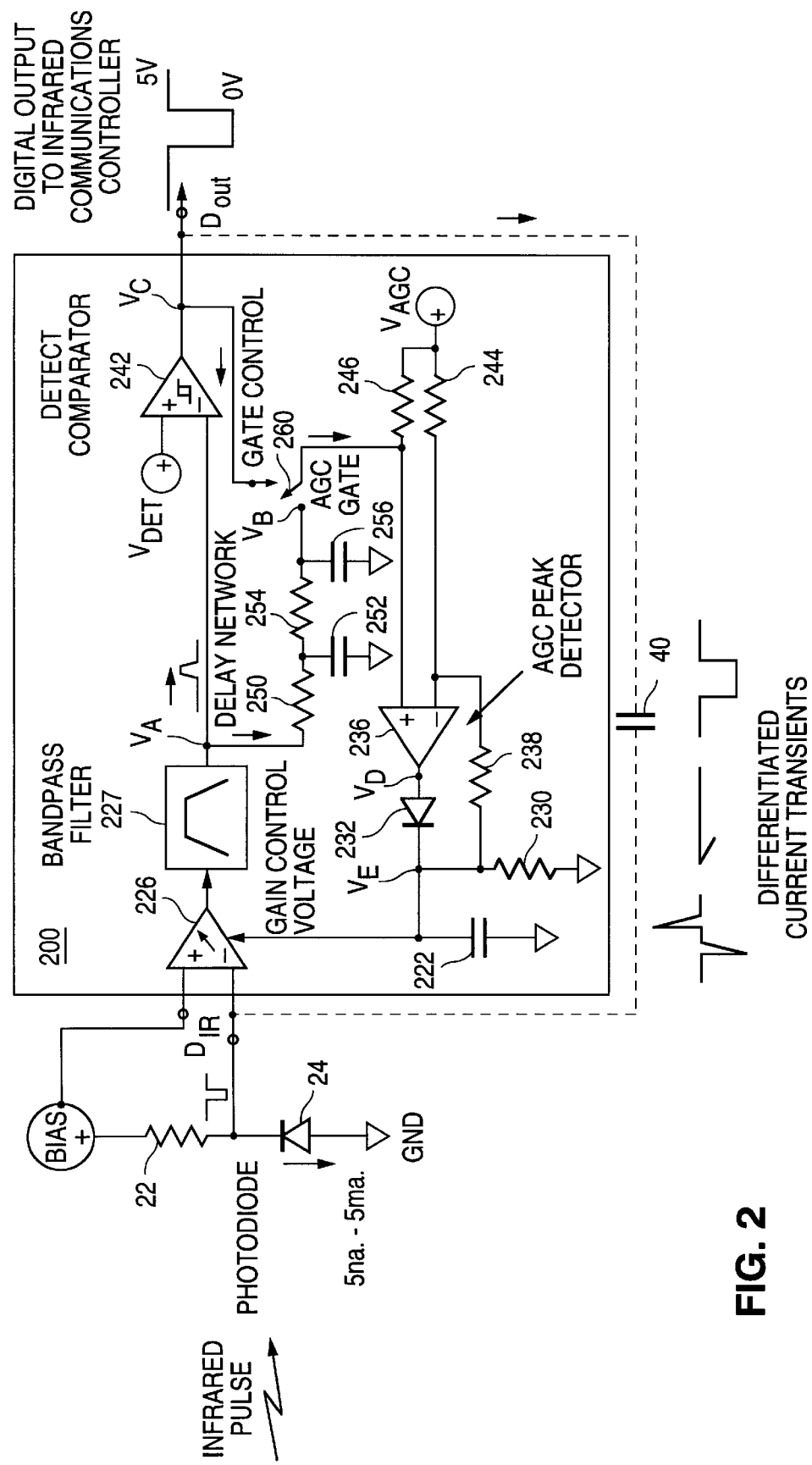
FIG. 2 is a simplified circuit diagram of an embodiment of an infrared receiver circuit according to the present invention.

FIG. 2 illustrates an infrared receiver circuit 200 designed to sample the output signal at $D_{OUT}$ for AGC purposes during an interval of the output waveform when a feedback transient signal is not present.

An infrared data signal is received at input terminal $D_{IR}$ of receiver 200 where the infrared data signal is received at a negative input of input amplifier 226 and to produce amplified data signal $V_A$, which is also bandpass filtered by filter 227. The infrared data signal is obtained from photodiode 24 which is coupled to a positive supply terminal, which provides a biasing voltage and which is also connected to a positive input terminal of input amplifier 226, through resistor 22 and which produces a modulated infrared data signal at input terminal $D_{IR}$ in response to an incident infrared light signal. The amplified data signal $V_A$ is input to comparator 242 which compares $V_A$ to detect threshold voltage $V_{DET}$ and outputs a demodulated data signal $V_c$ to output terminal $V_{OUT}$.

$V_A$ is also applied to a delay network constructed with resistors 250 and 254 and capacitors 252 and 256 to generate a delayed data signal $V_B$. The demodulated signal $V_c$ controls a switch 260 in order to sample $V_B$ for input to AGC amplifier 236 which compares the sampled data signal to AGC threshold voltage $V_{AGC}$ in order to obtain AGC peak detection signal $V_D$ at the output of amplifier 236. The AGC peak detection signal $V_D$ is then rectified by diode 232 and integrated by capacitor 222, which is coupled between the output terminal of diode 232 and a ground potential terminal, to produce gain control signal $V_E$ which controls the gain of input amplifier 226.

Figure 3:
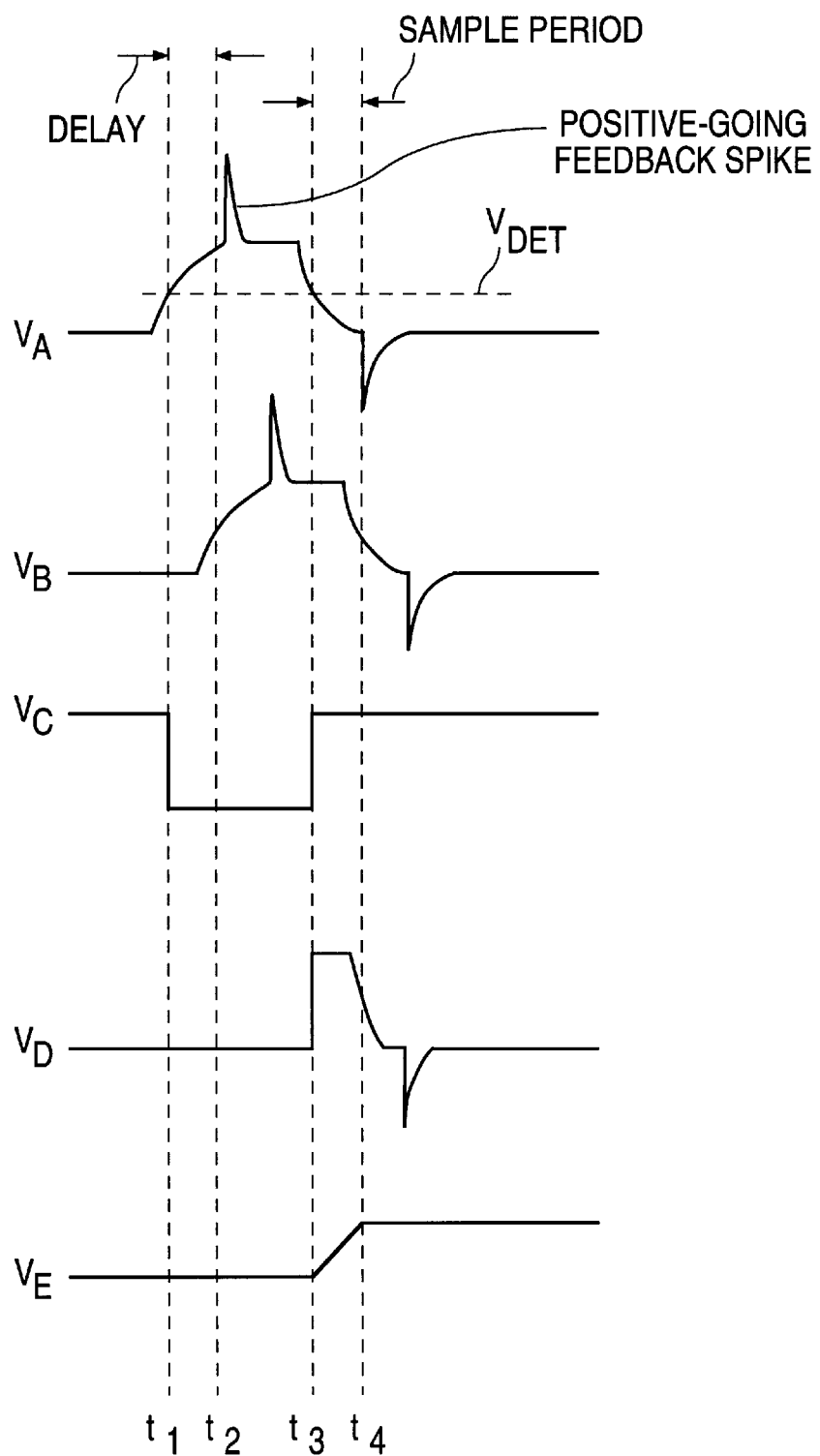
FIG. 3 is a waveform diagram illustrating the function of the receiver of FIG. 2.

The resulting waveforms generated in receiver 200 are illustrated in FIG. 3. The delay network generates waveform $V_B$ by shifting $V_A$ in time by a delay interval indicated by times $t_1$ and $t_2$. The leading edge of $V_A$ causes $V_C$ to transition to a low level at $t_1$ which causes switch 260 to open. A positive-going feedback impulse spike in the $V_C$ waveform is thus isolated from the input of AGC amplifier 236 during the interval from $t_2$ to $t_3$.

As the trailing edge of the pulse in waveform $V_A$ falls to detect threshold voltage $V_{DET}$ at time $t_3$, $V_C$ transitions to a high level causing switch 260 to close allowing AGC amplifier 236 to sample the amplitude of the delayed signal waveform $V_B$ in the interval from $t_3$ to $t_4$ during which, due to the delay introduced by the delay network, the delayed waveform is active but where the positive-going feedback transient spike is absent.

Thus, while switch 260 is closed, AGC amplifier 236 compares delayed signal waveform $V_B$ to the AGC threshold voltage $V_{AGC}$ and generates $V_D$. $V_D$ is then rectified by diode 232 and integrated by capacitor 222 in order to produce automatic gain control signal $V_E$. Thus, $V_E$ reflects the amplitude of the received and amplified signal $V_A$ without the error introduced by the positive-going feedback transient spike and adjusts the gain of the input amplifier 226 on the basis of the amplitude of the amplified data signal rather than the feedback signal. Receiver circuit 200 is thus able to achieve a high level of feedback suppression in the AGC gain control signal with a relatively simple circuit and without the addition of a shield, but also without experiencing significant AGC desensitization due to the feedback transients.

Having illustrated and described the principles of the present invention in the context of the embodiments described above, it should be readily apparent to those skilled in the art that the invention can be modified in arrangement and detail without departing from such principles. For example, while the present invention is described above in the context of an infrared receiver, it should be readily understood that the present invention is applicable to other signal receivers without departing from the scope and spirit of the present invention.

I claim:

1. A receiver circuit comprising:

a circuit input terminal for receiving an input signal;

a circuit output terminal;

an input amplifier having first and second input terminals, an output terminal and a gain control terminal, wherein the first input terminal of the input amplifier is coupled to the circuit input terminal and the second input terminal is coupled to a reference voltage terminal, and further wherein the input amplifier is configured to amplify a signal received at the input terminal of the input amplifier by a gain and output an amplified signal at the output terminal of the input amplifier, and further wherein the gain of the input amplifier is controlled by a gain control signal received at the gain control terminal of the input amplifier;

a comparator having first and second input terminals and an output terminal, wherein the first input terminal is configured to receive a detect threshold voltage, the second input terminal is coupled to the output terminal of the input amplifier, and the output terminal of the comparator is coupled to the circuit output terminal;

an analog delay circuit having input and output terminals, wherein the input terminal of the analog delay circuit is coupled to the second input terminal of the comparator;

a switch having an input and output terminals and a switching control terminal, wherein the input terminal of the switch is coupled to the output terminal of the analog delay circuit and the switching control terminal is coupled to the output terminal of the comparator, and further wherein the switch is configured to close a path between the input and output terminals of the switch responsive to a first logic level of a switch control signal received at the switching control terminal; and an automatic gain control circuit having input and output terminals, wherein the input terminal of the automatic gain control circuit is coupled to the output terminal of the switch and the output terminal of the automatic gain control circuit is coupled to the gain control terminal of the input amplifier.

2. The receiver circuit of claim 1, wherein the automatic gain control circuit further comprises:

a first amplifier having first and second input terminals and an output terminal, wherein the first input terminal is coupled to the input terminal of the automatic gain control circuit and the second input terminal is configured to receive an AGC threshold voltage;

a diode having input and output terminals, wherein the input terminal of the diode is coupled to the output terminal of the first amplifier, and wherein the output terminal of the diode is coupled to the output terminal of the automatic gain control circuit;

a first resistor coupled between the output terminal of the diode and the second input terminal of the first amplifier;

a second resistor coupled between the output terminal of the diode and a ground potential terminal; and a capacitor coupled between the output terminal of the diode and the ground potential terminal.

3. The receiver circuit of claim 1 further comprising a bandpass filter interposed the output terminal of the input amplifier and the second input terminal of the comparator.

4. The receiver circuit of claim 1 wherein the analog delay circuit is configured to delay the amplified signal received at the input terminal of the analog delay circuit by a time interval that is substantially as long in duration as a positive-going feedback transient.

5. The receiver circuit of claim 4 wherein the duration of the time interval of the analog delay circuit is less than a pulse width of a demodulated data signal at the output of the comparator.

6. The receiver circuit of claim 1 wherein the analog delay circuit further comprises a resistive and capacitive divider network.

7. The receiver circuit of claim 1 further including:

a photodiode coupled between the circuit input terminal and a ground potential terminal; and a resistor coupled between the circuit input terminal and a supply voltage terminal.

8. A method for controlling gain in a receiver, the method comprising the steps:

receiving a data signal;

amplifying the data signal by a gain factor to produce an amplified data signal;

converting the amplified data signal to a demodulated data signal;

delaying the amplified data signal to produce a delayed data signal;

sampling the delayed data signal responsive to the demodulated data signal to produce a sampled data signal;

adjusting the gain factor responsive to the sampled data signal;

comparing the sampled data signal to an automatic gain control threshold voltage to produce an automatic gain control peak detection signal;

rectifying and integrating the automatic gain control peak detection signal to produce a gain control signal; and adjusting the gain factor responsive to the gain control signal.

9. The method of claim 8 wherein the step of delaying the amplified data signal to produce a delayed data signal includes the steps of:

delaying the amplified data signal by a predetermined time interval; and selecting the predetermined time interval such that a sampling interval defined by the demodulated data signal coincides with an interval of the delayed data signal wherein a positive-going feedback transient is absent.

10. The method of claim 8 further including the step of bandpass filtering the amplified data signal.

11. A data receiving circuit, the circuit comprising:

an input amplifier configured to receive a data signal and amplify the data signal by a gain factor in order to produce an amplified data signal, wherein the input amplifier is further configured to vary the gain factor under control of a gain control signal;

a comparator configured to receive the amplified data signal and a detect threshold voltage, wherein the comparator is further configured to compare the amplified data signal to the detect threshold voltage in order to generate a demodulated data signal;

an analog delay network configured to receive the amplified data signal and delay the amplified data signal by a delay interval in order to produce a delayed data signal;

a switch configured to receive the delayed data signal and sample the delayed data signal responsive to the demodulated data signal in order to produce a sampled data signal; and an automatic gain control circuit configured to receive the sampled data signal and an automatic gain control threshold voltage, compare the sampled data signal to the automatic gain control threshold voltage in order to produce an automatic gain control peak detection signal, and rectify and integrate the automatic gain control peak detection signal in order to produce the gain control signal.

12. The data receiving circuit of claim 11, wherein the predetermined delay interval of the analog delay network is selected such that the delay interval is substantially the same as a duration of a feedback transient spike corresponding to feedback of the demodulated data signal from the comparator to the input amplifier.

13. The data receiving circuit of claim 11, further including:
  a bandpass filter configured to receive and bandpass filter the amplified data signal.

14. The data receiving circuit of claim 11, wherein the switch is further configured to sample the delayed data signal responsive to a high logic level of the demodulated data signal.

* * * * *